US006264416B1

United States Patent
Eaton, Jr.

(10) Patent No.: US 6,264,416 B1
(45) Date of Patent: Jul. 24, 2001

(54) COMPACT, SLIDE-OUT RAMP FOR A MINIVAN

(75) Inventor: David Hartwell Eaton, Jr., Scottsdale, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 0 days.

(21) Appl. No.: 09/521,485

(22) Filed: Mar. 9, 2000

(51) Int. Cl.[7] .................................................. B60P 1/43
(52) U.S. Cl. ................................. 414/537; 14/71.1
(58) Field of Search ....................... 414/537, 921, 414/522, 538; 14/69.5, 71.1

(56) References Cited

U.S. PATENT DOCUMENTS 4,827,548 * 5/1989 Hood ............................. 414/921 X
5,636,399    6/1997 Tremblay et al. ................. 14/71.1
5,832,555   11/1998 Saucier et al. .................... 14/71.1
5,845,356 * 12/1998 Kielinski ........................... 14/69.5

* cited by examiner

Primary Examiner—Frank E. Werner
(74) Attorney, Agent, or Firm—Paul F. Wille

(57) ABSTRACT

A pair of tracks extend between the side frame rails of a minivan, each track having an upper horizontal side, a lower horizontal side, and a vertical side. A powered trolley has a first set of wheels located between the horizontal sides of each track and a second set of wheels engaging the vertical sides of the tracks. A ramp or platform has an inner end coupled to the trolley and an outer end riding on the upper horizontal side of the track. At the outer end of each track, the upper horizontal side angles upwardly away from horizontal, causing the outer end of the ramp to lower when extended.

5 Claims, 4 Drawing Sheets

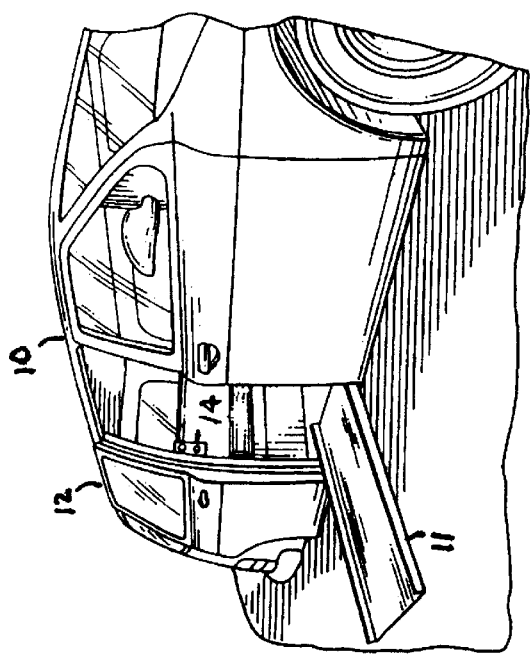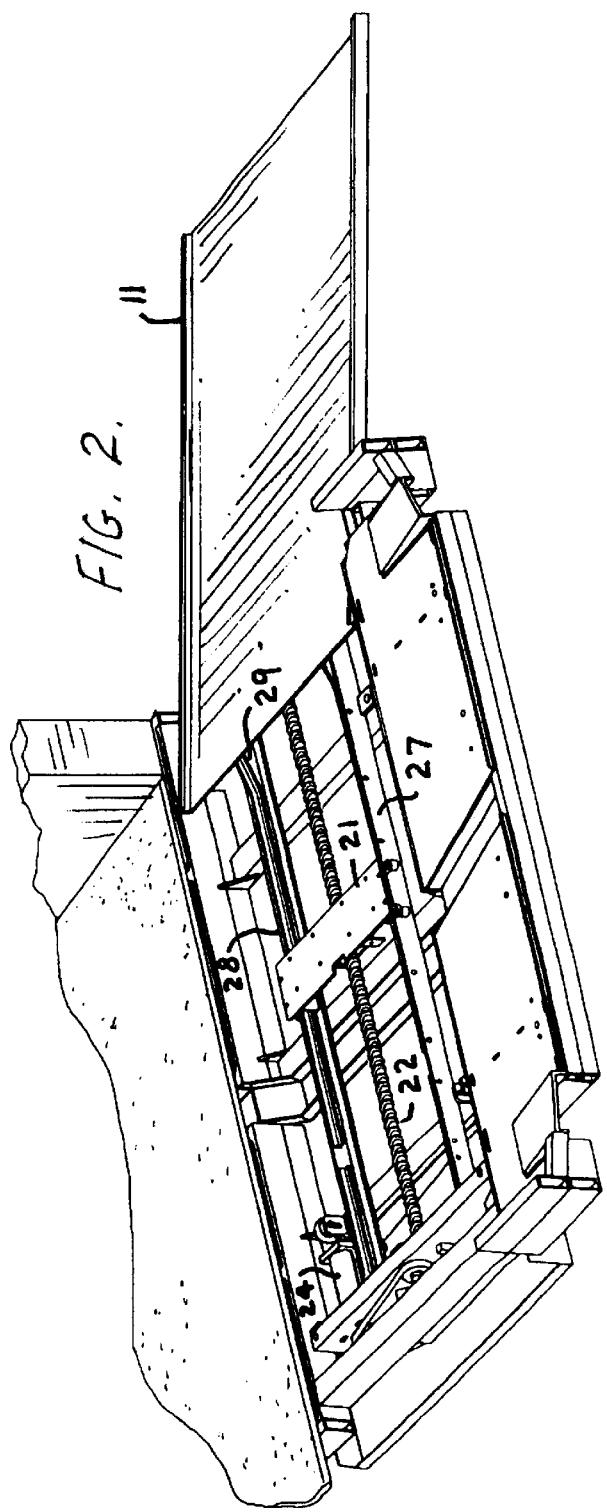

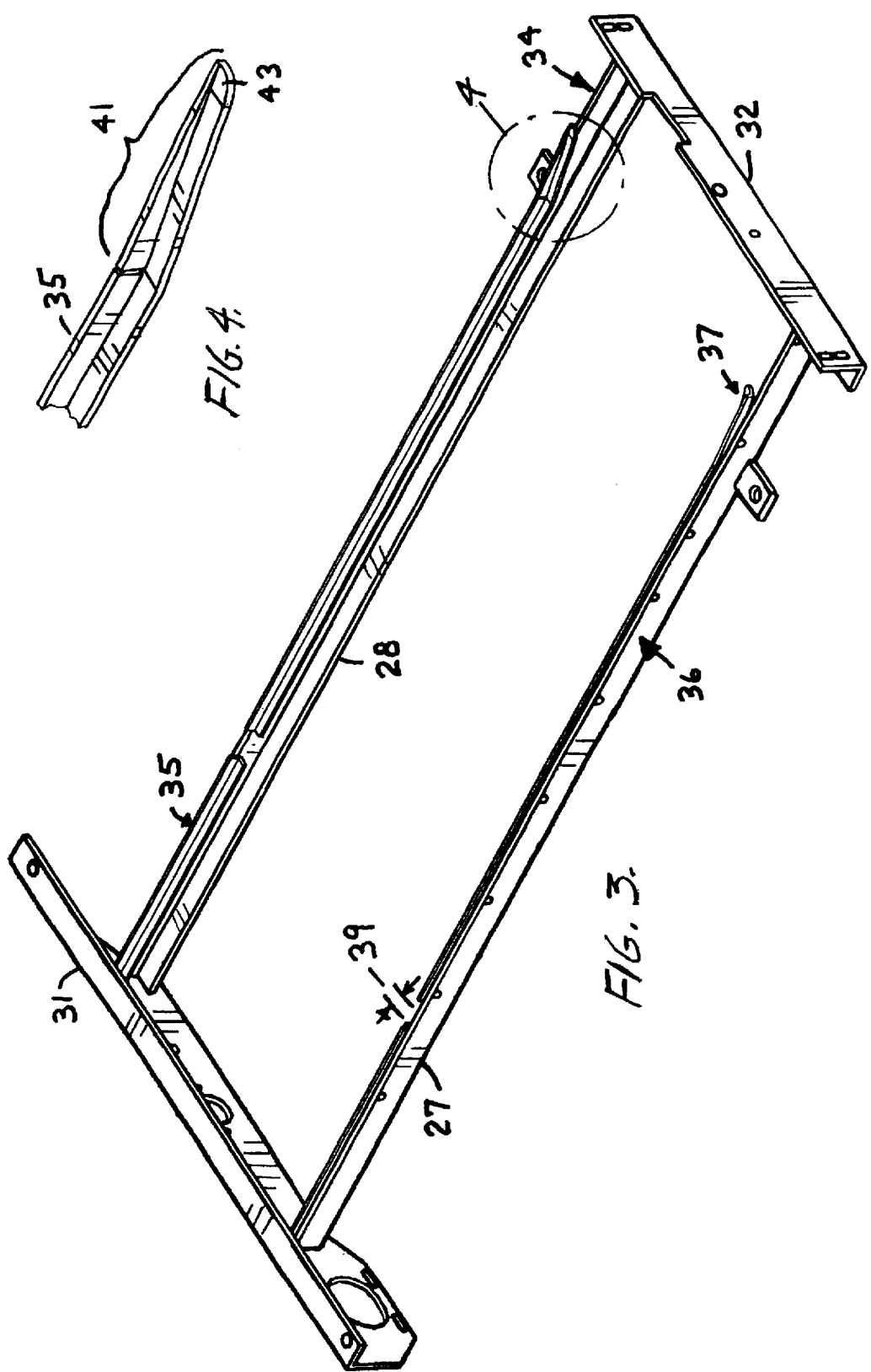

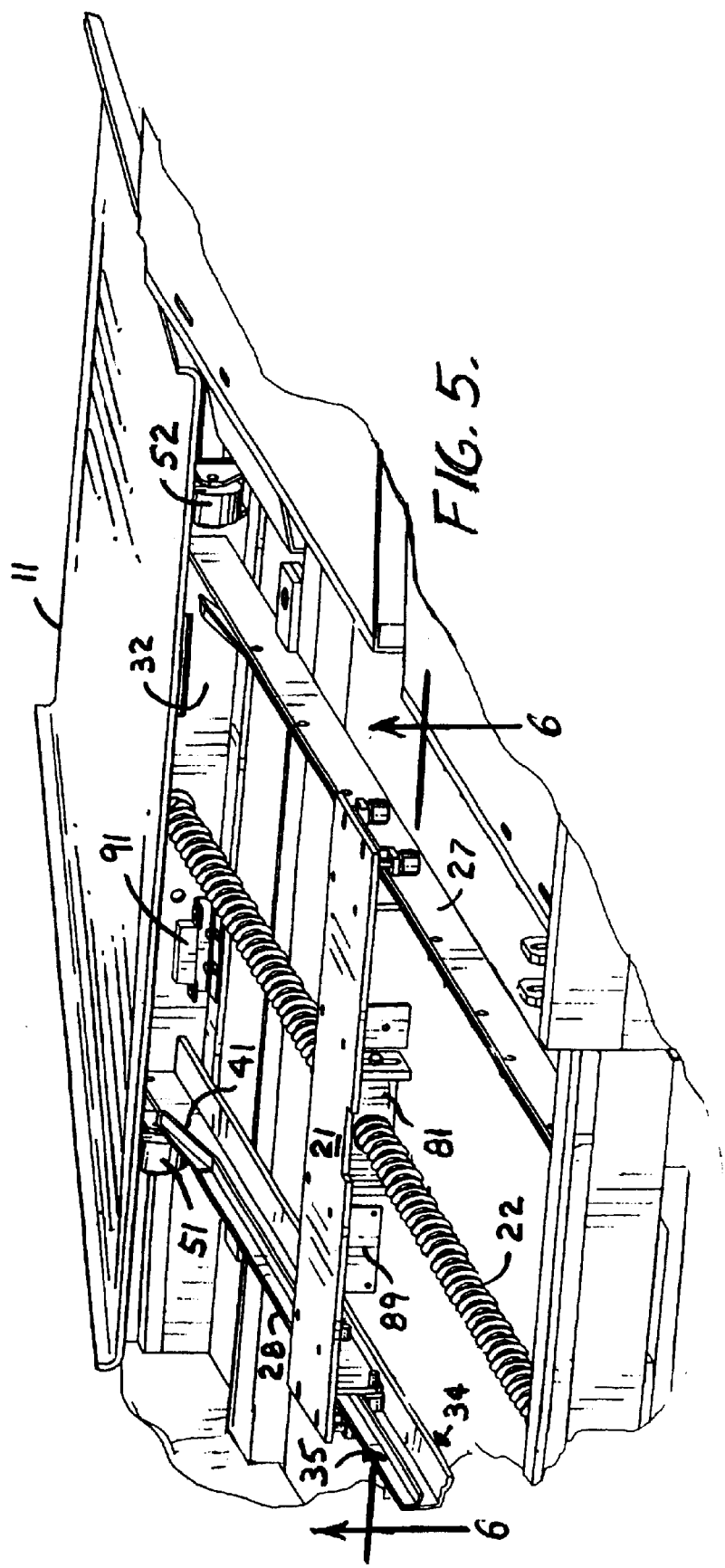

US 6,264,416 B1

COMPACT, SLIDE-OUT RAMP FOR A MINIVAN

BACKGROUND OF THE INVENTION

This invention relates to a wheelchair ramp for a minivan and, in particular, to a battery powered ramp mechanism that is low in height and compatible with the chassis of a minivan.

It is known in the art to provide a mechanism for enabling a person in a wheelchair to enter or leave a vehicle. Trucks, buses, and large vans have high ground clearance and are typically provided with a lift rather than a ramp, which would be too long or too steep. Any ramp associated with a lift for a vehicle having a high ground clearance merely provides a gradual transition from the ground to the height of a platform that is raised or lowered. A type of light truck known as a minivan has a lower ground clearance than larger vehicles. Thus, a ramp can be used without a lift and the ramp either folds in half when stored or slides sideways into the minivan.

In general, a ramp mechanism is much more compact than a lift mechanism but such considerations are relative. Even ramp mechanisms as presently constructed take up a significant amount of space in a critical location, under the floor of the minivan. Low roof height and a practical ground clearance define the space within which one must work. The height of the ramp mechanism determines the amount of headroom for a person in a wheelchair and anything that reduces the height of the ramp mechanism adds to headroom and to the comfort of the passengers.

The frame or chassis of the vehicle constrains the design of a ramp mechanism in two ways. A sideways extending ramp must travel either under or over a side rail of the chassis. If the ramp goes under the rail, ground clearance is compromised. If the ramp goes over the rail, headroom is compromised. Thus, the thickness of the mechanism is constrained.

The side to side distance between the rails of a chassis provides a second constraint on a slide-out ramp because the ramp cannot be wider than the interior of the vehicle nor travel more than the same width. Often, the amount of travel is significantly less because of the actuating apparatus that must fit between the side rails of a chassis. This is why fold-out ramps are frequently used instead of slide-out ramps, despite the ungainly appearance and intrusion of the fold-out ramp in a minivan. One could use a multi-track arrangement to extend travel, somewhat like the tracks for a sliding drawer, but such mechanisms are bulky and require a track running the length of the ramp.

In view of the foregoing, it is therefore an object of the invention to provide an electrically powered ramp mechanism that is lower in height than ramp mechanisms of the prior art.

Another object of the invention is to provide a compact drive mechanism for a ramp for a minivan, wherein the drive mechanism for the ramp is as unobtrusive as possible within the minivan.

A further object of the invention is to provide a ramp that goes over the frame or chassis of a minivan with minimal reduction in headroom within the minivan.

Another object of the invention is to provide a ramp mechanism that fits within the chassis of a minivan and is approximately the same height as the thickness of the chassis.

A further object of the invention is to provide a slide-out ramp that has as much travel as possible from a single track system to minimize ramp slope and facilitate wheelchair ingress.

SUMMARY OF THE INVENTION

The foregoing objects are achieved in this invention in which a pair of tracks extend between the side frame rails of a minivan, each track having an upper horizontal side, a lower horizontal side, and a vertical side. A powered trolley has a first set of wheels located between the horizontal sides of each track and a second set of wheels engaging the vertical sides of the tracks. At the outer end of each track, the upper horizontal side slants upwardly away from horizontal. A ramp or platform has an inner end coupled to the trolley and an outer end supported by wheels aligned with a side frame rail of the minivan. When the trolley rides along the slanted portion of the track, the outer end of the ramp lowers to contact the ground.

BRIEF DESCRIPTION OF THE DRAWINGS

A more complete understanding of the invention can be obtained by considering the following detailed description in conjunction with the accompanying drawings, in which:

FIG. 1 is a perspective view of a ramp extending from a minivan;

FIG. 2 is a perspective view of the ramp extended and separated from the trolley;

FIG. 3 is a perspective view of the frame for the ramp mechanism;

FIG. 4 is a detail of FIG. 3 showing the upward slant of the outer end of the track for the trolley;

FIG. 5 is a perspective view showing the major components of the ramp mechanism.

DETAILED DESCRIPTION OF THE INVENTION

Figure 6:
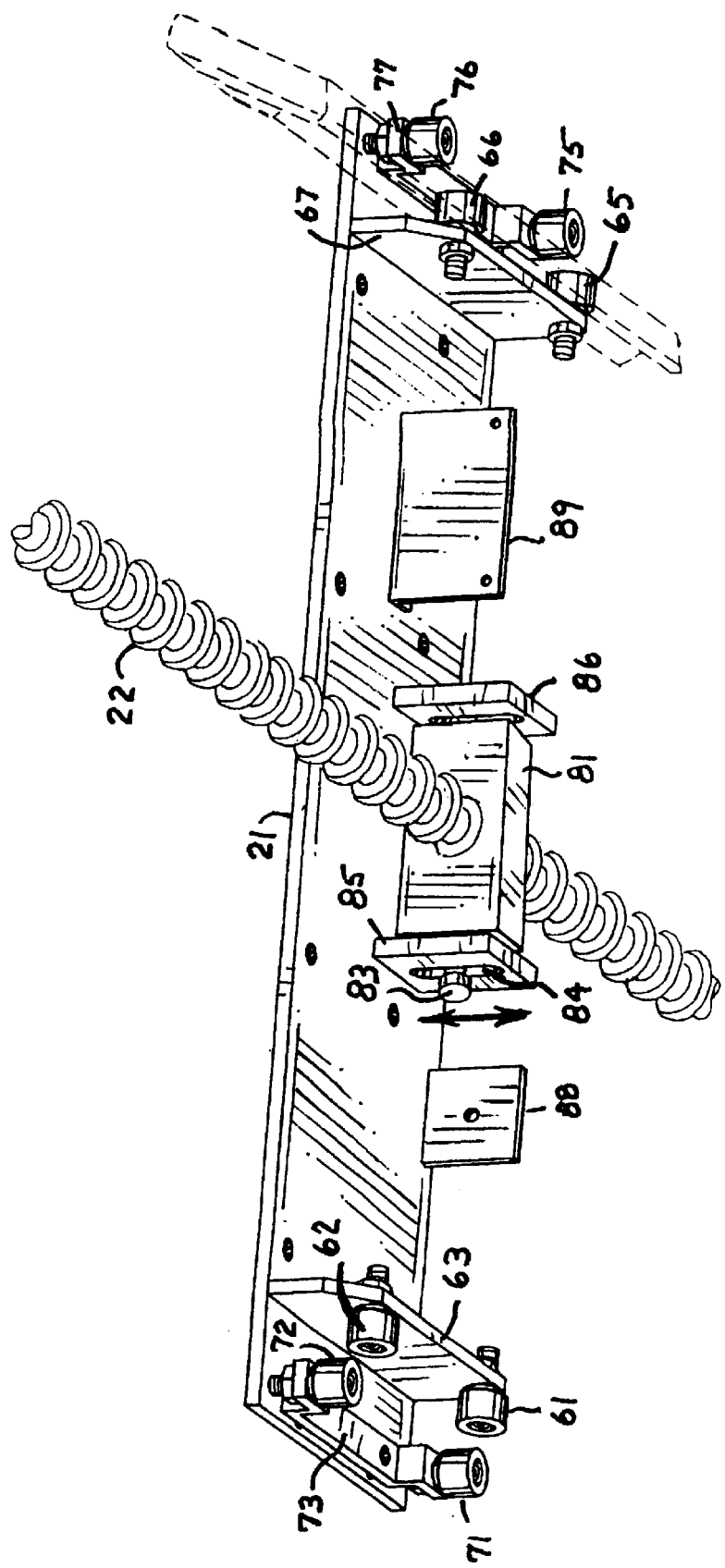
FIG. 6 is a perspective view of the trolley.

FIG. 1 illustrates the right hand side of minivan 10 having ramp 11 attached to the minivan and extending sideways through the opening for sliding door 12. Within minivan 10, control 14 is positioned on the door jamb and is electrically coupled to the ramp mechanism for extending and retracting the ramp. A battery (not shown) in minivan 10 provides electrical power for the drive mechanism.

FIG. 2 illustrates the ramp mechanism in more detail, as it might be seen from the back seat in the minivan with the ramp cover removed. Ramp 11 is normally attached to trolley 21, which is driven by screw 22. Screw 22, in turn, is mechanically coupled to motor 24 for bidirectionally rotating the screw as directed by control 14 (FIG. 1). Motor 24 is preferably coupled to screw 22 by a cog belt and pulleys, which provide some mechanical gain.

Trolley 21 rides on tracks 27 and 28, which have a distinct upwardly angled section, such as section 29, at the outer ends thereof. Wheels (not shown in FIG. 2) near the outboard frame rail of the minivan support ramp 11 during extension. As trolley 21 nears the end of its travel, the trolley engages the upwardly sloping portion of the track. As the trolley moves up, the outer end of ramp 11 moves down, pivoting on the wheels. The pivoting action provides at least two advantages. A first advantage is the reduced height of the ramp mechanism. A second advantage is that the outer end of ramp 11 lowers to the ground.

FIG. 3 illustrates the construction of the tracks in accordance with a preferred embodiment of the invention. Tracks 27 and 28 are held in parallel, spaced relationship by end frame members 31 and 32. Each track includes two pieces of angle iron 34, 35 and 36, 37, nested to form a channel for trapping a set of wheels on the trolley. The smaller pieces, 35 and 37, have a gap therein, such as gap 39, for facilitating attaching the trolley to the tracks, enabling the trolley and ramp to be dropped into the tracks at a nearly retracted position.

The tracks are slightly shorter than the inside width between the rails of the chassis to allow room for the belt and pulleys (FIG. 2) on the outside of end frame member 31. End frame member 32 is attached to the right-hand rail (not shown) of the minivan's chassis and end frame member 31 is attached to the left-hand rail (not shown) of the minivan's chassis.

FIG. 4 illustrates the end of track 35 in detail. End portion 41 can be a separate piece or, preferably, is made by cutting a slot in one side of the angle iron and bending the other side to form the upwardly extending angle portion. Tip 43 is ground as shown to prevent portions of the track from extending above the top of end frame 32 (FIG. 3).

FIG. 5 is a low angle, perspective view looking out the sliding door of a minivan. Ramp 11 is resting on rollers 51 and 52 that are attached to end frame 32. Rollers 51 and 52 are adjustable and the tops of the rollers are set slightly higher than the top of the side frame rail of the minivan. Rollers 51 and 52 support ramp 11 during its travel and provide the pivoting action described above. Trolley 21 is shown separated from ramp 11 for purpose of illustration but is normally attached near the inner end of ramp 11. (A few inches of ramp 11 extend past trolley 21 to cover the belt and pulleys (FIG. 2)). Trolley 21, shown in detail in FIG. 6, includes four sets of wheels, each set containing a pair of wheels. Fewer wheels could be used but pairs of wheels provide redundancy and a smoother operation than single wheels.

FIG. 6 is a perspective view of trolley 21 from outside the minivan, looking up from underneath the ramp (not shown). Trolley 21 includes wheels 61 and 62 attached to bracket 63, which holds the axes of the wheels parallel to the ramp. Similarly, wheels 65 and 66 are attached to bracket 67. Wheels 61, 62, 65, and 66 ride within the channel formed between the angle irons in each track to vertically support the ramp. When ramp 11 is fully retracted, wheels 65 and 66 ride on lower angle iron 34 (FIG. 5). When ramp 11 is extended approximately half way, the wheels 65 and 66 ride on the underside of upper angle iron 35.

Trolley 21 preferably includes additional wheels for stabilizing the fore and aft motion (relative to the minivan) of the ramp. Wheels 71 and 72 are attached to bracket 73 which holds the axes of the wheels vertical. Similarly, wheels 75 and 76 are attached to bracket 77. As shown in FIG. 5, wheels 71, 72, 75, and 76 ride on the outsides of tracks 27 and 28, thereby trapping the tracks between the wheel sets.

Trolley 21 is moved by screw 22 engaging threaded block 81, which preferably includes a split-nut (not shown) for releasably engaging the screw. Threaded block 81 can move vertically through a limited range to allow the outer end of the ramp to move up and down as the ramp extends or retracts substantially horizontally. Bolt 83 extends through vertical slot 84 in bracket 85 to engage threaded block 81. Bolt 83 is securely attached to threaded block 81 but does not crimp bracket 85, thereby providing a sliding fit. Threaded block 81 is similarly attached to bracket 86 at the opposite end of the threaded block.

Brackets 85 and 86 are attached to trolley 21 by any suitable means, such as welding. Brackets 88 and 89 are also attached by any suitable means. Brackets 88 and 89 limit the motion of the ramp when attached to trolley 21. Referring to FIG. 5, bracket 89 engages block 91 on end frame 32 to limit the extension of ramp 11. Similarly, bracket 88 engages a stop block (not shown) to limit the retraction of ramp 11. The actual extension and retraction of ramp 11 is electrically controlled with position sensors (not shown). Brackets 88 and 89 provide a fail-safe stop mechanism.

Referring to FIG. 5, as ramp 11 is extended, rollers 51 and 52 support the ramp. The outer end of ramp 11 may drop slightly as the center of gravity of the ramp passes rollers 51 and 52 due to the slight vertical travel in block 81. There may also be a slight drop in the outer end of ramp 11 as the wheels on the carriage engage the upper surface of the tracks after the center of gravity of the ramp passes rollers 51 and 52. Except for these slight shifts, ramp 11 is substantially horizontally during most of its travel.

As the back wheel on each pair of wheels on the trolley engage the upwardly extending portion of the track, the outer end of the ramp lowers until it meets the ground. Trolley 21 can move up and down slightly because threaded block 81 rides in vertical slots, as described in connection with FIG. 6, which allows for some variation in ground height, e.g. a curb or berm. For retraction, screw 22 turns in the opposite direction and the operation proceeds in reverse.

By trapping trolley wheels in a C-channel and using both horizontal sides of the C-channel for a track, a compact drive is obtained. The pulley and belt coupling fits between one end frame and a rail of the minivan and the motor fits along side one track, parallel and substantially co-planar with the track. Thus, the ramp mechanism has a low overall height and nestles between the rails of a chassis to provide maximum headroom and maximum ground clearance. The rail of the chassis is cleared during extension, obviating the need for a higher floor. When fully retracted, ramp 11 lies between the side frame rails of the minivan and covers the ramp mechanism.

The invention thus provides an electrically powered ramp mechanism that is lower in height than ramp mechanisms of the prior art and is as unobtrusive as possible within a minivan. The ramp lowers near the end of its travel and can accommodate variations in ground height. The entire ramp mechanism fits between the rails of the chassis of a minivan and is approximately the same height as the rails.

Having thus described the invention, it will be apparent to those of skill in the art that various modifications can be made within the scope of the invention. For example, although illustrated with the open sides of the tracks facing each other, the tracks and wheel brackets can be reversed. A screw drive is preferred because of its simplicity and ruggedness but other drives, such as belt drives, could be used instead. Although its most likely application is for a minivan, the slide-out ramp of this invention can be used on other vehicles.

What is claimed as the invention is:

1. A compact, powered, slide-out ramp mechanism for a minivan having a chassis including two side rails of predetermined height as measured vertically, each side rail having a top and a bottom, said mechanism comprising:

a pair of end frames;

a pair of tracks attached to and held in spaced apart, parallel relationship by said end frames;

each track having an upper horizontal side, a lower horizontal side, and a vertical side, wherein each upper horizontal side includes a portion angled upwardly away from horizontal at an outer end of the track;

a trolley having a first set of wheels located between the horizontal sides of each track and movable along said tracks from side to side in the minivan;

a ramp having an inner end mounted on said trolley and an outer end;

wherein the tracks, trolley, and ramp are located between horizontal planes extending from the top and bottom of the side rail on the driver's side of the minivan;

at least one roller supporting the outer end of said ramp just above the side rail on the passenger's side of the minivan as the ramp is extended;

whereby the outer end of said ramp extends over the side rail on the passenger's side and lowers when the trolley engages the upwardly angled portion as the ramp pivots on said at least one roller.

2. The ramp mechanism as set forth in claim 1 wherein said trolley further includes a threaded block coupled to a screw.

3. The ramp mechanism as set forth in claim 2 and further including:

an electric motor having an axis parallel with said tracks and substantially co-planar with said tracks; and means for coupling said motor to said screw.

4. The ramp mechanism as set forth in claim 2 and further including:

a pair of brackets attached to said trolley, each bracket having a substantially vertical slot therein; and a bolt through each slot engaging said threaded block;

whereby the trolley can move vertically relative to the threaded block when the ramp pivots near full extension, thereby preventing displacement of said screw.

5. The ramp mechanism as set forth in claim 1 wherein said trolley further includes a second set of wheels for engaging said vertical sides of said tracks.

* * * * *